US012747812B2

(12) United States Patent
Harris

(10) Patent No.: US 12,747,812 B2
(45) Date of Patent: Sep. 29, 2026

(54) ANNULUS CONNECTION

(71) Applicant: BAKER HUGHES ENERGY TECHNOLOGY UK LIMITED, Bristol (GB)

(72) Inventor: Jonathan James Harris, Newcastle Upon Tyne (GB)

(73) Assignee: Baker Hughes Energy Technology UK Limited, Bristol (GB)

( * ) Notice: Subject to any disclaimer, the term of this patent is extended or adjusted under 35 U.S.C. 154(b) by 87 days.

(21) Appl. No.: 17/754,042

(22) PCT Filed: Sep. 23, 2020

(86) PCT No.: PCT/GB2020/052304

§ 371 (c)(1),
(2) Date: Mar. 22, 2022

(87) PCT Pub. No.: WO2021/058952

PCT Pub. Date: Apr. 1, 2021

(65) Prior Publication Data

US 2022/0341523 A1 Oct. 27, 2022

(30) Foreign Application Priority Data

Sep. 24, 2019 (GB) ...................................... 1913758

(51) Int. Cl.
*F16L 33/01* (2006.01)
*F16L 55/07* (2006.01)

(52) U.S. Cl.
CPC ............... *F16L 33/01* (2013.01); *F16L 55/07* (2013.01)

(58) Field of Classification Search
CPC ......... F16L 33/01; F16L 33/26; F16L 39/005; F16L 39/00; F16L 39/02; F16L 55/07;
(Continued)

(56) References Cited

U.S. PATENT DOCUMENTS 6,039,083 A * 3/2000 Loper .................. F16L 11/083 138/135
2015/0369400 A1* 12/2015 Dill ........................ G01M 3/04 138/147

FOREIGN PATENT DOCUMENTS

EP 1 363 061 11/2003
GB 2 163 465 2/1986
(Continued)

OTHER PUBLICATIONS

Office Action mailed Nov. 2, 2023 in corresponding EP Application No. EP 20 780 778.5-1015.
(Continued)

*Primary Examiner* — Aaron M Dunwoody
(74) *Attorney, Agent, or Firm* — Hogan Lovells Cadwalader US LLP

(57) ABSTRACT

Apparatus and methods for terminating an end of flexible pipe body, the apparatus comprising an elongate end fitting body, associated with a central longitudinal axis, comprising a connector flange region securable in a back-to-back relationship to a further end fitting body and disposed at a first end of the elongate end fitting body, an open mouth at a remaining end of the end fitting body, a central flange region disposed between the first end and the remaining end and a neck region between the central flange and the connector flange, wherein the neck region comprises a radially inner end fitting neck region portion and a radially outer end fitting neck region portion that is spaced apart from and is radially outside the radially inner end fitting neck region portion to provide an enclosed chamber region therebetween.

20 Claims, 10 Drawing Sheets

(58) Field of Classification Search
CPC ......... F16L 13/11; F16L 41/082; E21B 17/01; E21B 17/028
See application file for complete search history.

(56) References Cited

FOREIGN PATENT DOCUMENTS

| | | | |
|---|---|---|---|
| WO | 00/22336 | A1 | 4/2000 |
| WO | 2008/053142 | A2 | 5/2008 |
| WO | 2016178001 | A1 | 11/2016 |
| WO | 2018/002571 | A1 | 1/2018 |

OTHER PUBLICATIONS

Technical Report mailed Dec. 12, 2023 in corresponding BR Application No. BR112022004753-3.
Extended European Search Report issued in EP Application No. 25170732.9 dated Jul. 9, 2025.

* cited by examiner

ANNULUS CONNECTION

BACKGROUND OF THE INVENTION i) Field of the Invention

The present invention relates to a method and apparatus for terminating flexible pipe body. In particular, but not exclusively, the present invention relates to an end fitting and method for terminating flexible pipe body that provides an enclosed chamber region in a neck of an end fitting. The enclosed chamber region can be used as part of a fluid communication passageway for venting fluid or as a housing for auxiliary equipment that could be provided for a variety of purposes.

ii) Description of the Related Art

Traditionally flexible pipe is utilised to transport production fluids, such as oil and/or gas and/or water, from one location to another. Flexible pipe is particularly useful in connecting a sub-sea location (which may be deep underwater, say 1000 metres or more) to a sea level location. The pipe may have an internal diameter of typically up to around 0.6 metres (e.g. diameters may range from 0.05 m up to 0.6 m). A flexible pipe is generally formed as an assembly of flexible pipe body and one or more end fittings. The pipe body is typically formed as a combination of layered materials that form a pressure-containing conduit. The pipe structure allows large deflections without causing bending stresses that impair the pipe's functionality over its lifetime. There are different types of flexible pipe such as unbonded flexible pipe which is manufactured in accordance with API 17J or composite type flexible pipe or the like. The pipe body is generally built up as a combined structure including polymer layers and/or composite layers and/or metallic layers. For example, pipe body may include polymer and metal layers, or polymer and composite layers, or polymer, metal and composite layers. Layers may be formed from a single piece such as an extruded tube or by helically winding one or more wires at a desired pitch or by connecting together multiple discrete hoops that are arranged concentrically side-by-side. Depending upon the layers of the flexible pipe used and the type of flexible pipe some of the pipe layers may be bonded together or remain unbonded.

Some flexible pipe has been used for deep water (less than 3,300 feet (1,005.84 metres)) and ultra-deep water (greater than 3,300 feet) developments. It is the increasing demand for oil which is causing exploration to occur at greater and greater depths (for example in excess of 8202 feet (2500 metres)) where environmental factors are more extreme. For example in such deep and ultra-deep water environments ocean floor temperature increases the risk of production fluids cooling to a temperature that may lead to pipe blockage. In practice flexible pipe conventionally is designed to perform at operating temperatures of −30° C. to +130° C., and is being developed for even more extreme temperatures. Increased depths also increase the pressure associated with the environment in which the flexible pipe must operate. For example, a flexible pipe may be required to operate with external pressures ranging from 0.1 MPa to 30 MPa acting on the pipe. Equally, transporting oil, gas or water may well give rise to high pressures acting on the flexible pipe from within, for example with internal pressures ranging from zero to 140 MPa from bore fluid acting on the pipe. As a result the need for high levels of performance from certain layers such as a pipe carcass or a pressure armour or a tensile armour layer of the flexible pipe body is increased. It is noted for the sake of completeness that flexible pipe may also be used for shallow water applications (for example less than around 500 metres depth) or even for shore (overland) applications.

During operation of a flexible pipe a pipe annulus, which is a zone defined between a radially outer surface of an innermost fluid retaining layer and a radially inner surface of an outer fluid retaining layer such as an outer sheath, requires venting. Such an operation must occur before a partial or full depressurisation of a bore in a flexible pipe. During normal operating procedures accumulation of fluid in the annulus is avoided by continually or repeatedly exhausting gas from the annulus to a surface vessel or platform where the vented fluid can be burned via a flare system. Providing a continuous vent path between multiple segments of flexible pipe body and end fittings is challenging. However, without venting a pressure in the annulus region can increase over time. Eventually the accumulated pressure can exceed a bore pressure in normal operation causing rupture. Alternatively if a riser needs to be detached from a surface vessel or platform (for example in the case of adverse weather conditions) a depressurisation of the bore is intentionally implemented. This results in bore pressure potentially being less than accumulated annulus pressure which can cause rupture.

Conventionally various designs of end fitting have been proposed that can include venting passages. Many of these work well but can suffer from certain disadvantages. For example whilst many conventional end fittings provide an ability to provide vent paths or connecting passageways to allow an annulus region or other regions of flexible pipe body to be vented or interconnected such mechanisms are limited in their usefulness and/or are complex and thus costly to implement.

In more detail certain conventional techniques supply adjacent annulus connection systems having external components, such as hoses or tubes, external to an end fitting. These external components tend to be relatively fragile and may become damaged during transportation or use. Such damage can allow irreparable ingress of oxygenated seawater into the annulus.

Certain conventional venting techniques require end fitting bodies to include through bores which can be utilised to form part of a vent pathway. According to many conventional techniques the passages through conventional end fitting bodies include longitudinally extending as well as radially extending fluid communication passageway portions. A problem with this technique is that in manufacturing the end fitting body careful alignment is required to form radially extending passageway portions in a way which satisfactorily meet other fluid communication passageway portions. This is a complex procedure, is prone to user error and creates 90 degree bends in a passageway portion which can inhibit fluid flow or lead to collection points for detritus/material.

Certain conventional techniques require through bores or external pipework to form fluid communication passageway portions for a vent path. These internal passageways or external pipes can be difficult to manufacture and/or are prone to damage.

It is also known that during use of a flexible pipe chemicals/compounds dissolved in fluid being transported by the flexible pipe can cause damage to components of the flexible pipe body layers. Alternatively/additionally compounds/chemicals can accumulate in areas of the flexible pipe body and over time these can cause problems.

Many different types of flexible pipe body design have been successfully manufactured. In some cases such flexible pipe body can incorporate sensors or sensing elements able to monitor continuously or on demand one more characteristics associated with the flexible pipe body. For example fibre optic elements have been utilised to provide bend radius information. Other characteristics such as temperature and pressure have been successfully measured. However, the introduction of these sensory elements causes complications because of a need to provide power for such elements and/or to provide a pathway for output carrying elements (such as wires or optical fibres) to have a path to reach a surface supply and monitoring centre. This problem is particularly difficult when multiple segments of flexible pipe body and thus multiple flexible pipes connected via respective end fittings are connected in a back-to-back configuration, effectively creating a long length of flexible pipe from multiple flexible pipes. The interface where adjacent flexible pipes are connected together must be designed in order to "pass through" power and/or input/output signals and/or monitoring elements and this can complicate end fitting design and flexible pipe body design and flexible pipe design.

SUMMARY

It is an aim of the present invention to at least partly mitigate one or more of the above-mentioned problems.

It is an aim of certain embodiments of the present invention to provide an enclosed chamber region in flexible pipe body end fittings whereby the enclosed chamber region can be provided in a convenient fashion and also can be used for a variety of purposes.

It is an aim of certain embodiments of the present invention to provide part of a fluid communication passageway, that can be used as part of a vent passage, through a neck of an end fitting body.

It is an aim of certain embodiments of the present invention to provide an end fitting body with an enclosed chamber large enough to house auxiliary equipment or one or more active agents which can serve a selected purpose.

It is an aim of certain embodiments of the present invention to provide an end fitting body that has a neck that in cross section is arranged in a pipe-in-pipe arrangement to provide a relatively large cross section of open volume in the end fitting body which can be used for various purposes.

It is an aim of certain embodiments of the present invention to provide a method of terminating an end of flexible pipe body which results in an enclosed chamber region in an end fitting being open to regions of terminated flexible pipe body.

It is an aim of certain embodiments of the present invention to provide a method of terminating an end of flexible pipe body whereby an enclosed chamber is provided in fluid communication with an annulus region of the flexible pipe body for venting purposes and/or chemical interaction.

It is an aim of certain embodiments of the present invention to connect adjacent flexible pipes in a back-to-back configuration and in a way that vent passages and/or sensory elements and/or power or readout pathways are aligned and connectable along a whole length of the combined pipe.

It is an aim of certain embodiments of the present invention to provide an enclosed region which acts as a buffer zone at ends of flexible pipes in the end fittings used to terminate flexible pipe body.

It is an aim of certain embodiments of the present invention to provide an enclosed chamber usable for a variety of purposes in a way that is applicable to a wide variety of possible end fitting designs.

It is an aim of certain embodiments of the present invention to provide a method of terminating an end of flexible pipe body in a way which supports and, where necessary, seals respective layers of flexible pipe body and simultaneously puts an annulus of the flexible pipe body in fluid communication with one or more openings in a flange connector of the end fitting body.

According to a first aspect of the present invention there is provided apparatus for terminating an end of flexible pipe body, comprising:

- an elongate end fitting body, associated with a central longitudinal axis, comprising a connector flange region securable in a back-to-back relationship to a further end fitting body and disposed at a first end of the elongate end fitting body, an open mouth at a remaining end of the end fitting body, a central flange region disposed between the first end and the remaining end and a neck region between the central flange and the connector flange; wherein
- the neck region comprises a radially inner end fitting neck region portion and a radially outer end fitting neck region portion that is spaced apart from and is radially outside the radially inner end fitting neck region portion to provide an enclosed chamber region therebetween.

Aptly the radially inner end fitting neck region portion comprises a generally cylindrical outer surface and the radially outer end fitting neck region portion comprises a generally cylindrical inner surface that is disposed in a concentric or eccentric spaced apart relationship with the cylindrical outer surface.

Aptly the radially inner end fitting neck region portion and the radially outer end fitting neck region portion are disposed in a pipe-in-pipe relationship.

Aptly the connector flange region, central flange region and radially inner end fitting neck region portion, and optionally the radially outer end fitting neck region portion, are integrally formed.

Aptly the elongate end fitting body comprises a termination member that includes the connector flange region, the neck region and a first portion of the central flange region; and a core member that comprises a further portion of the central flange region and an elongate nose region extending from the further central flange region portion and that includes a radially inward facing support surface region proximate to the remaining end.

Aptly the apparatus further comprises an outer casing securable to the central flange region; and an activation flange securable to the outer casing.

Aptly the enclosed chamber region comprises an elongate annulus shaped region.

Aptly the enclosed chamber region provides a passageway portion that extends across a whole length of the neck region.

Aptly the apparatus further comprises a vent passage comprising a first fluid communication passageway portion, that comprises said a passageway portion, that includes a first fluid inlet/outlet port proximate to an end of the first fluid communication passageway portion and a further fluid inlet/outlet port on an end surface of the connector flange region distal to the open mouth.

Aptly the apparatus further comprises at least one active agent disposed in the enclosed chamber region.

Aptly the apparatus further comprises at least one filter element each disposed proximate to at least one of a first end and a remaining end of the enclosed chamber region in which the active agent is disposed.

Aptly the active agent comprises an oxygen scavenger and/or a de-hydrating agent and/or a corrosion inhibitor and/or a chemical for removing H2S and/or a chemical for removing $CO_2$ and/or a dye or colour indicating chemical.

Aptly each active agent is in the form of a powdered solid and/or solid granules and/or a liquid.

Aptly the active agent is a reagent and/or reactant and/or solvent or catalyst.

Aptly the enclosed chamber houses auxiliary equipment.

Aptly the auxiliary equipment comprises a heating element or heater, a length of electrical cable or fibre optic or a signal booster or an electrical or optical monitor device.

According to a second aspect of the present invention there is provided a method of terminating an end of flexible pipe body, comprising the steps of:

- providing flexible pipe body that comprises a fluid retaining layer, at least one armour layer and an outer sheath;
- providing an elongate end fitting body, comprising a connector flange region, a central flange region and a neck region between the connector flange region and the central flange region, at a free end of the flexible pipe body, said end fitting body supporting a terminated end of at least one layer of the flexible pipe body, thereby providing a vent passage that comprises a first fluid communication passageway portion provided by an enclosed chamber region between a radially inner end fitting neck portion and a radially outer end fitting neck region portion in fluid communication with a flexible pipe annulus associated with the flexible pipe body;
- securing an outer casing to the central flange region; and
- securing an activation flange to the outer casing.

Aptly providing the elongate end fitting body comprises providing a radially inner end fitting neck region portion that comprises a cylindrical outer surface; and

- providing a radially outer end fitting neck region portion that comprises a generally cylindrical inner surface that is disposed in a concentric or eccentric spaced apart relationship with the cylindrical outer surface.

Aptly providing the fluid communication passageway portion comprises providing a first fluid inlet/outlet port proximate to an end of the first fluid communication passageway portion and a further fluid inlet/outlet port on an end surface of the connector flange distal to an open mouth of the end fitting body.

According to a third aspect of the present invention there is provided a method of venting fluid from a flexible pipe annulus, comprising the steps of selectively opening at least one valve member thereby fluidly connecting a vent passage between a flexible pipe annulus, located between an inner fluid retaining layer and an outer sheath of flexible pipe body, and an exhaust port; and

- subsequently venting fluid from the flexible pipe annulus via the vent passage through an enclosed chamber region, that is disposed in a neck region of an elongate end fitting body between a radially inner end fitting neck region portion and a radially outer end fitting neck region portion that is spaced apart from and is radially outside the radially inner end fitting neck region portion.

Aptly the method further comprises venting fluid from the flexible pipe annulus via a first fluid communication passageway portion that comprises the enclosed chamber region and via a further fluid communication passageway portion that extends across the connector flange region.

Aptly the method further comprises venting fluid from the flexible pipe annulus via a still further fluid communication passageway portion that comprises either a through bore through the central flange and an aligned tube having an open end in a tensile armour termination cavity, or a through bore through a core portion of the end fitting body.

According to a fourth aspect of the present invention there is provided apparatus for terminating an end of flexible pipe body, comprising:

- an elongate end fitting body, associated with a central longitudinal axis, comprising a connector flange region securable in a back-to-back relationship to a further end fitting body and disposed at a first end of the elongate end fitting body, an open mouth at a remaining end of the end fitting body, a central flange region between the first end and the remaining end and a neck region between the central flange and the connector flange; and
- at least one first fluid communication passageway portion that extends across a whole length of the neck region following a straight path and at a constant radial distance that is greater than a radial distance between the central longitudinal axis and a radially inwardly facing pressure sheath support surface region of the end fitting body proximate to the open mouth.

Aptly the apparatus further comprises a further fluid communication passageway portion that extends across the connector flange following a straight path at said a constant radial distance; and

- a still further fluid communication passageway portion that extends across at least a region of the central flange following a straight path at said a constant radial distance.

Aptly said a constant radial distance is less than a radial distance between the central longitudinal axis and a radially outermost edge of the central flange.

Aptly the apparatus further comprises a vent passage comprising the first fluid communication passageway portion and including a first fluid inlet/outlet port proximate to an end of the first fluid communication passageway portion and a further fluid inlet/outlet port on an end surface of the connector flange distal to the open mouth, said vent passage including no radially extending fluid communication passageway portion.

Aptly the end fitting body is integrally formed.

Aptly the elongate end fitting body comprises a termination member that includes the connector flange region, the neck region and a first portion of the central flange region; and

- a core member that comprises a further portion of the central flange region and said support surface region.

Aptly the core member further comprises a yet further fluid communication passageway portion that follows a straight path through the core member at said a constant radial distance.

Aptly the further portion of the central flange includes an end surface that includes a first seal element and a further seal element spaced apart from the first seal element and an inlet/outlet port at an end of the yet further fluid communication passageway is disposed at a location between the first and further seal elements.

Aptly the apparatus further comprises at least one cover member that each extend along the whole length of the neck region and enclose an elongate space provided between an outer surface of a neck body portion of the end fitting body and an inner surface of the cover member wherein said elongate space comprises a whole or a portion of the first fluid communication passageway portion.

Aptly in plan view each cover member is a substantially rectangular plate member and has an arcuate cross section that seals a respective channel-like recess that runs along the outer surface of the neck body portion and each elongate space sealed by a respective cover member is an elongate channel.

Aptly said at least one cover member comprises a plurality of cover members disposed circumferentially around the neck region to thereby provide a plurality of respective elongate spaces and the first fluid communication passageway portion comprises the respective elongate spaces.

Aptly said at least one cover member comprises a generally cylindrical sheath that is concentric with, and spaced apart from, an outer surface of a neck body portion of the elongate end fitting body and the elongate space comprises an elongate annulus-like space.

Aptly each cover member is secured with respect to the neck body portion to create an air tight seal between the cover member and the neck body portion.

Aptly each cover member is secured by a welding process to the neck body portion or is bolted to the neck body portion and/or is welded or bolted to sides of flange regions of the elongate end fitting body.

Aptly the apparatus further comprises at least one active agent disposed in at least one first fluid communication passageway portion.

Aptly the apparatus further comprises at least one filter element disposed proximate to a first end and a remaining end of the first fluid communication passageway portion in which active agent is disposed.

Aptly the active agent comprises an oxygen scavenger and/or a de-hydrating agent and/or a corrosion inhibitor and/or a chemical for removing H2S and/or a chemical for removing $CO_2$ and/or a dye or colour indicating chemical.

Aptly each active agent is in the form of a powdered solid and/or solid granules and/or liquid.

Aptly the active agent is a reagent and/or reactant and/or solvent or catalyst.

Aptly the apparatus further comprises auxiliary equipment disposed in at least one first fluid communication passageway portion.

Aptly the auxiliary equipment comprises a heating element or heater, a length of electrical cable or fibre optic or a signal booster or an electrical or optical monitor.

According to a fifth aspect of the present invention there is provided a method of venting fluid from a flexible pipe body annulus, comprising the steps of:

- selectively opening at least one valve member thereby fluidly connecting a vent passage between a flexible pipe annulus, located between an inner fluid retaining layer and an outer sheath of flexible pipe body, and an exhaust port; and
- subsequently venting fluid from the flexible pipe body annulus via the vent passage through at least one fluid communication passageway portion that extends across a whole length of a neck region of an elongate end fitting body, following a straight path and at a constant radial distance that is greater than a radial distance between a central longitudinal axis and a radially inwardly facing pressure sheath support surface region of the end fitting body proximate to an open mouth of the end fitting body.

Aptly the method further comprises venting fluid through the first fluid communication passageway portion at a constant radial distance that is less than a radial distance between the central longitudinal axis and the radially outer most edge of a central flange of the elongate end fitting body.

Aptly the method further comprises venting fluid via a vent passage including no radially extending fluid communication passageway portion.

According to a sixth aspect of the present invention there is provided apparatus for terminating an end of flexible pipe body, comprising:

- an elongate end fitting body, associated with a central longitudinal axis, comprising a connector flange region securable in a back-to-back relationship to a further end fitting body and disposed at a first end of the elongate end fitting body, an open mouth at a remaining end of the end fitting body, a central flange region disposed between the first end and the remaining end and a neck region between the central flange and the connector flange; wherein
- the neck region comprises at least one elongate recess in an outer surface of the end fitting body that extends across the neck and is covered by an elongate cover element secured to the end fitting body to provide a sealed chamber region between the outer surface of the neck region and the cover.

Aptly the radially inner end fitting neck region portion comprises a generally cylindrical outer surface with a plurality of elongate recesses arranged in a spaced apart substantially parallel arrangement circumferentially around an outer surface of the neck region with a respective elongate cover element secured over each elongate recess.

According to a seventh aspect of the present invention there is provided a method of terminating an end of flexible pipe body, comprising the steps of:

- providing flexible pipe body that comprises a fluid retaining layer, at least one armour layer and an outer sheath;
- providing an elongate end fitting body comprising a connector flange region, a central flange region and a neck region between the connector flange region and the central flange region, at a free end of the flexible pipe body, said end fitting body supporting a terminated end of at least one layer of the flexible pipe body, thereby providing a vent passage that comprises at least one first fluid communication passageway portion provided by a sealed chamber region provided by a covered elongate recess in an outer surface of a neck region of the elongate end fitting body, in fluid communication with a flexible pipe annulus associated with a flexible pipe body;
- securing an outer casing to the central flange region; and
- securing an activation flange to the outer casing.

Certain embodiments of the present invention provide apparatus for terminating an end of flexible pipe body and/or a method of terminating an end of flexible pipe body and/or a method of manufacturing an end fitting.

Certain embodiments of the present invention provide an end fitting body that includes a neck that contains an enclosed chamber region. The chamber region can be utilised to house auxiliary equipment or to provide a portion of a fluid communication passageway that can be used as a vent passage. Optionally a door or window can be provided in an outer surface to enable visual or physical access to the chamber region in the neck.

Certain embodiments of the present invention provide an end fitting body that has a neck arranged in a pipe-in-pipe relationship whereby a spaced between an inner and outer generally cylindrical part of the neck defines an enclosed chamber region. Optionally the chamber provided by the space extends along more than 60% of the length of the neck.

Certain embodiments of the present invention provide an elongate end fitting body that includes a termination member and a core member.

Certain embodiments of the present invention provide an end fitting that includes a connector flange, a central flange, an open mouth and a radially outer portion and a radially inner portion of an end fitting neck that are all integrally formed.

Certain embodiments of the present invention provide an end fitting that contains at least one active agent in fluid communication with an annulus region of flexible pipe body terminated in an end fitting. Optionally the active agent is an oxygen scavenger or corrosion inhibiter or the like.

Certain embodiments of the present invention provide a method of terminating an end of flexible pipe body in an end fitting. The termination methodology simultaneously seals and supports layers of the flexible pipe body whilst putting one or more regions such as an annulus of the flexible pipe body in fluid communication with openings on the outside of the end fitting. For example one or more openings that act as parts can be provided on an end surface of a flange connector of the end fitting body. This enables flexible pipes to be arranged in a back-to-back relationship aligning openings/ports on the flange connectors of adjacent end fittings so that a continuous pathway, possibly used for venting or for carrying sensory elements or power, can extend throughout a length of the combined flexible pipe.

Certain embodiments of the present invention provide a method of venting fluid from a flexible pipe annulus. Part of a fluid communication passageway used during a venting process is formed by an enclosed space that extends along and within a neck region of an end fitting body. This helps avoid the need for external piping or tubing typical as is the case with certain conventional techniques.

Certain embodiments of the present invention provide an end fitting body and a method for venting which include only communication passageway portions that follow a straight path and at a constant radial distance. Constant radial distance in this sense means the radial distance of a centre line of the passageway is constantly the same relative to a central axis associated with the pipe bore or is only gently sloping constantly by 0-10° relative to the axis. Aptly the slope is 0-5°. This can help manufacturing costs when an elongate end fitting body is manufactured and also assist during termination of flexible pipe body whereby alignment of fluid communication passageway portions is made easy for workmen.

Certain embodiments of the present invention only utilise axially extending fluid communicating passageway portions. That is to say the vent passage includes no radially extending fluid communication passageway portion. That is to say no passageway portions that form part of a vent path for venting an annulus follow a path along an imaginary radius extending out from a central bore. The passageway portions may include use passageway portions that extend gently radially in a straight direction at 0-10° relative to a main axis. This means that manufacturing of an elongate end fitting body is straightforward relative to conventional manufacturing techniques.

BRIEF DESCRIPTION OF THE DRAWINGS

Certain embodiments of the present invention will now be described hereinafter, by way of example only, with reference to the accompanying drawings in which.

In the drawings like reference numerals refer to like parts.

DETAILED DESCRIPTION

Throughout this description, reference will be made to a flexible pipe. It is to be appreciated that certain embodiments of the present invention are applicable to use with a wide variety of flexible pipe. For example certain embodiments of the present invention can be used with respect to flexible pipe body and associated end fittings of the type which is manufactured according to API 17J. Such flexible pipe is often referred to as unbonded flexible pipe. Other embodiments are associated with other types of flexible pipe.

Figure 1:
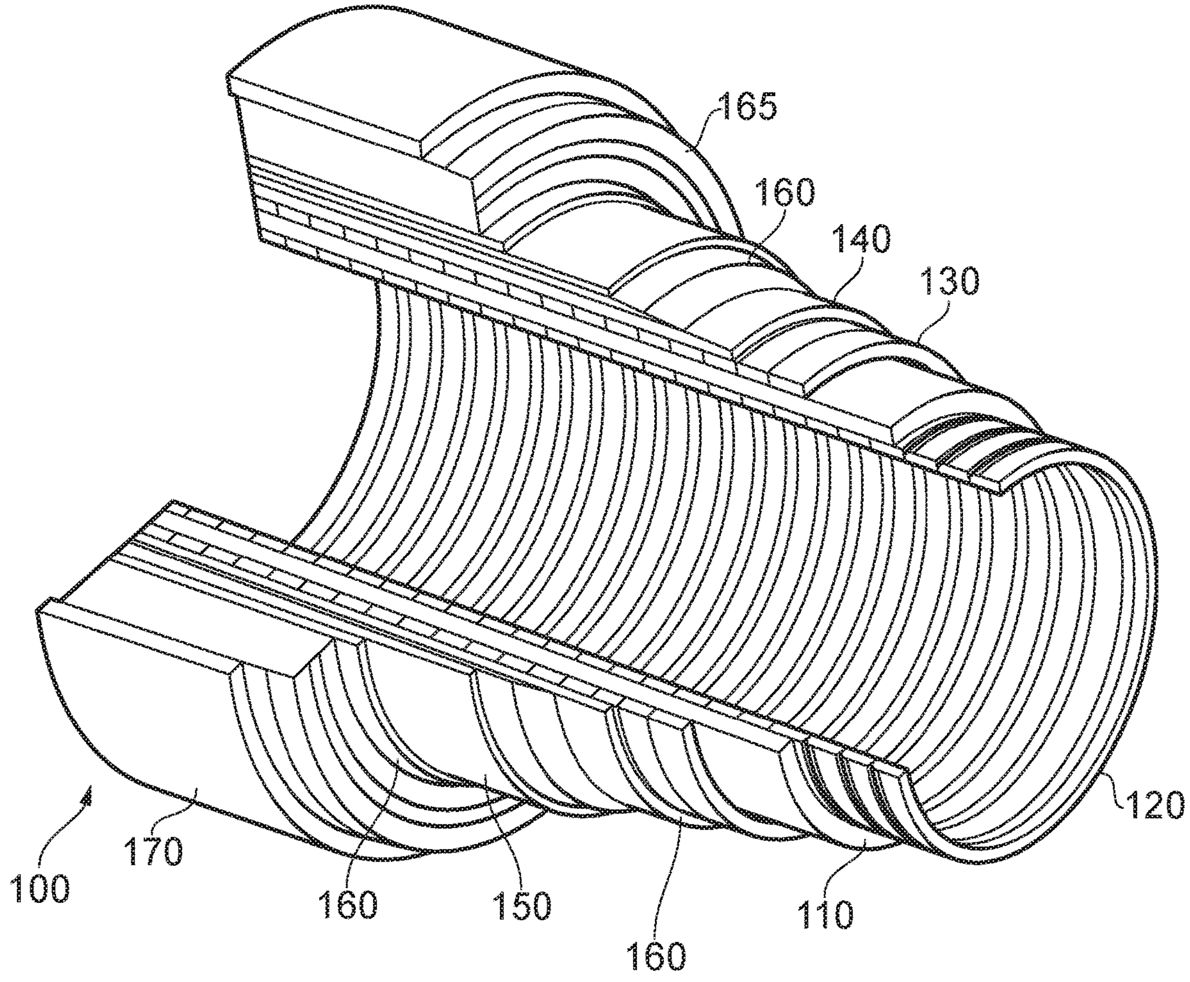
FIG. 1 illustrates flexible pipe body.

Turning to FIG. 1 it will be understood that the illustrated flexible pipe is an assembly of a portion of pipe body and one or more end fittings (not shown in FIG. 1) in each of which a respective end of the pipe body is terminated. FIG. 1 illustrates how pipe body 100 is formed from a combination of layered materials that form a pressure-containing conduit. As noted above although a number of particular layers are illustrated in FIG. 1, it is to be understood that certain embodiments of the present invention are broadly applicable to coaxial pipe body structures including two or more layers manufactured from a variety of possible materials. The pipe body may include one or more layers comprising composite materials, forming a tubular composite layer. It is to be further noted that the layer thicknesses are shown for illustrative purposes only. As used herein, the term “composite” is used to broadly refer to a material that is formed from two or more different materials, for example a material formed from a matrix material and reinforcement fibres.

A tubular composite layer is thus a layer having a generally tubular shape formed of composite material. Alternatively a tubular composite layer is a layer having a generally tubular shape formed from multiple components one or more of which is formed of a composite material. The layer or any element of the composite layer may be manufactured via an extrusion, pultrusion or deposition process or, by a winding process in which adjacent windings of tape which themselves have a composite structure are consolidated together with adjacent windings. The composite material, regardless of manufacturing technique used, may optionally include a matrix or body of material having a first characteristic in which further elements having different physical characteristics are embedded. That is to say elongate fibres which are aligned to some extent or smaller fibres randomly orientated can be set into a main body or spheres or other regular or irregular shaped particles can be embedded in a matrix material, or a combination of more than one of the above. Aptly the matrix material is a thermoplastic material, aptly the thermoplastic material is polyethylene or polypropylene or nylon or PVC or PVDF or PFA or PEEK or PTFE or alloys of such materials with reinforcing fibres manufactured from one or more of glass, ceramic, basalt, carbon, carbon nanotubes, polyester, nylon, aramid, steel, nickel alloy, titanium alloy, aluminium alloy or the like or fillers manufactured from glass, ceramic, carbon, metals, buckminsterfullerenes, metal silicates, carbides, carbonates, oxides or the like.

The pipe body 100 illustrated in FIG. 1 includes an internal pressure sheath 110 which acts as a fluid retaining layer and comprises a polymer layer that ensures internal fluid integrity. The layer provides a boundary for any conveyed fluid. It is to be understood that this layer may itself comprise a number of sub-layers. It will be appreciated that when a carcass layer 120 is utilised the internal pressure sheath is often referred to by those skilled in the art as a barrier layer. In operation without such a carcass (so-called smooth bore operation) the internal pressure sheath may be referred to as a liner. A barrier layer 110 is illustrated in FIG. 1.

It is noted that a carcass layer 120 is a pressure resistant layer that provides an interlocked construction that can be used as the innermost layer to prevent, totally or partially, collapse of the internal pressure sheath 110 due to pipe decompression, external pressure, and tensile armour pressure and mechanical crushing loads. The carcass is a crush resistant layer. It will be appreciated that certain embodiments of the present invention are thus applicable to 'rough bore' applications (with a carcass). Aptly the carcass layer is a metallic layer. Aptly the carcass layer is formed from stainless steel, corrosion resistant nickel alloy or the like. Aptly the carcass layer is formed from a composite, polymer, or other material, or a combination of materials and components. A carcass layer is radially positioned within the barrier layer.

The pipe body includes a pressure armour layer 130 that is a pressure resistant layer that provides a structural layer that increases the resistance of the flexible pipe to internal and external pressure and mechanical crushing loads. The layer also structurally supports the internal pressure sheath. Aptly as illustrated in FIG. 1 the pressure armour layer is formed as a tubular layer. Aptly for unbonded type flexible pipe the pressure armour layer consists of an interlocked construction of wires with a lay angle close to 90°. Aptly in this case the pressure armour layer is a metallic layer. Aptly the pressure armour layer is formed from carbon steel, aluminium alloy or the like. Aptly the pressure armour layer is formed from a pultruded composite interlocking layer. Aptly the pressure armour layer is formed from a composite formed by extrusion or pultrusion or deposition. A pressure armour layer is positioned radially outside an underlying barrier layer.

The flexible pipe body also includes a first tensile armour layer 140 and second tensile armour layer 150. Each tensile armour layer is used to sustain tensile loads and optionally also internal pressure. Aptly for some flexible pipes the tensile armour windings are metal (for example steel, stainless steel or titanium or the like). For some composite flexible pipes the tensile armour windings may be polymer composite tape windings (for example provided with either thermoplastic, for instance nylon, matrix composite or thermoset, for instance epoxy, matrix composite). For unbonded flexible pipe the tensile armour layer is formed from a plurality of wires (to impart strength to the layer) that are located over an inner layer and are helically wound along the length of the pipe at a lay angle typically between about 10° to 55°. Aptly the tensile armour layers are counter-wound in pairs. Aptly the tensile armour layers are metallic layers. Aptly the tensile armour layers are formed from carbon steel, stainless steel, titanium alloy, aluminium alloy or the like. Aptly the tensile armour layers are formed from a composite, polymer, or other material, or a combination of materials.

Aptly the flexible pipe body includes optional layers of tape 160 which help contain underlying layers and to some extent prevent abrasion between adjacent layers. The tape layer may optionally be a polymer or composite or a combination of materials, also optionally comprising a tubular composite layer. Tape layers can be used to help prevent metal-to-metal contact to help prevent wear. Tape layers over tensile armours can also help prevent "birdcaging".

The flexible pipe body also includes optional layers of insulation 165 and an outer sheath 170, which comprises a polymer layer used to protect the pipe against penetration of seawater and other external environments, corrosion, abrasion and mechanical damage. Any thermal insulation layer helps limit heat loss through the pipe wall to the surrounding environment.

Each flexible pipe comprises at least one portion, referred to as a segment or section, of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
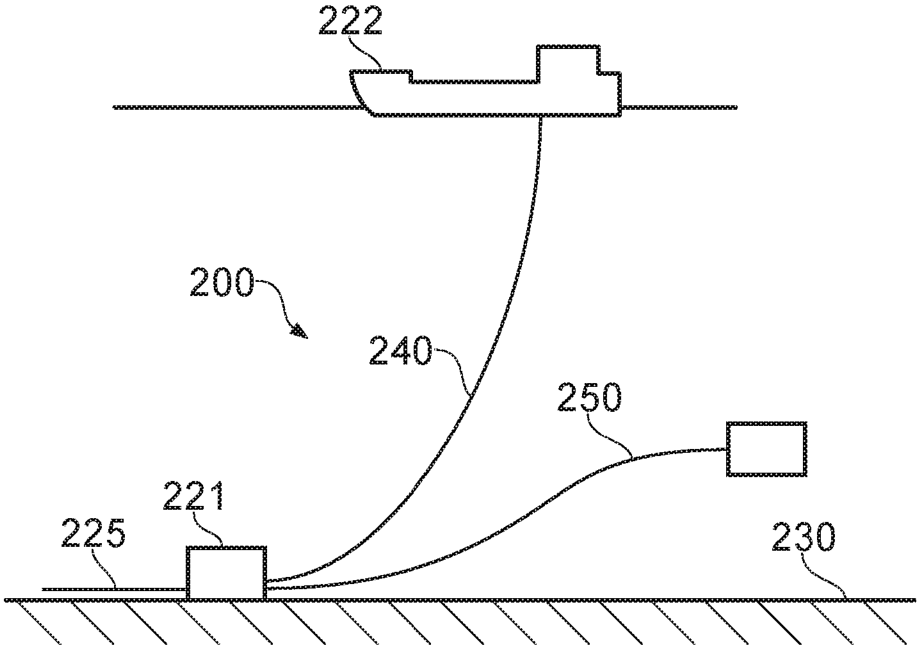
FIG. 2 illustrates certain uses of a flexible pipe.

FIG. 2 illustrates a riser assembly 200 suitable for transporting production fluid such as oil and/or gas and/or water from a sub-sea location 221 to a floating facility 222. For example, in FIG. 2 the sub-sea location 221 includes a sub-sea flow line 225. The flexible flow line 225 comprises a flexible pipe, wholly or in part, resting on the sea floor 230 or buried below the sea floor and used in a static application. The floating facility may be provided by a platform and/or buoy or, as illustrated in FIG. 2, a ship. The riser assembly 200 is provided as a flexible riser, that is to say a flexible pipe 240 connecting the ship to the sea floor installation. The flexible pipe may be in segments of flexible pipe body with connecting end fittings.

It will be appreciated that there are different types of riser, as is well-known by those skilled in the art. Certain embodiments of the present invention may be used with any type of riser, such as a freely suspended (free-hanging, catenary riser), a riser restrained to some extent (buoys, chains), totally restrained riser or enclosed in a tube (I or J tubes). Some, though not all, examples of such configurations can be found in API 17J. FIG. 2 also illustrates how portions of flexible pipe can be utilised as a jumper 250.

Figure 3:
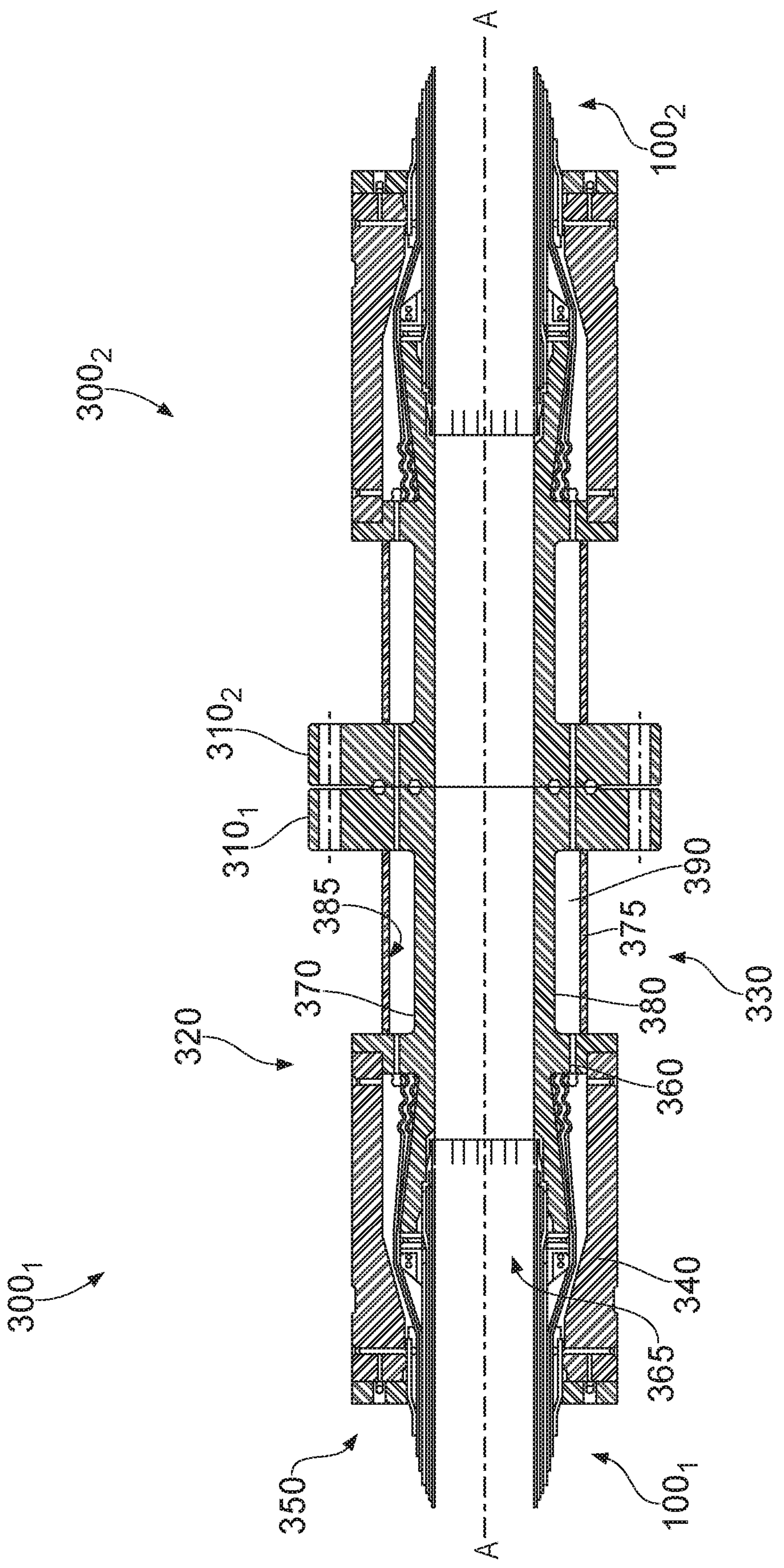
FIG. 3 illustrates end fittings arranged in a back-to-back configuration.

FIG. 3 illustrates two end fittings 300$_1$, 300$_2$ arranged in a back-to-back arrangement. Each end fitting terminates a respective end of a respective segment of flexible pipe body 100$_1$, 100$_2$. The end fittings are connected together via respective connector flanges 310$_1$, 310$_2$. These are bolted together via bolts (not shown in FIG. 3) and have matching seal rings on opposing faces. Each end fitting 300 further includes a central flange 320 spaced apart from the connector flanges 310$_{1,2}$ via a neck region 330. An outer casing 340 is secured to the central flange and an activation flange 350 is secured to the casing 340 and seals against an outer surface of an outer sheath 170 of the flexible pipe body 100. A radially innermost surface of the outer casing 340 is spaced apart from a radially outer surface of a generally cylindrical but slightly flared outwards end of an elongate end fitting body 360 of the end fitting. An open mouth 365 of the end fitting body faces the segment of flexible pipe body. Tensile armour wires are terminated in the tapered space between the outer casing and the end fitting body. Aptly epoxy is located in the tapered space to entomb the ends of the tensile armour wires. The end fitting 300 is associated with a central longitudinal axis A-A and the central longitudinal axis of each end fitting is aligned along a common line when the end fittings are arranged in a back-to-back configuration. During use production fluids are transported along a bore provided by the barrier layer or liner of the flexible pipe body and the inner surface of each end fitting 300.

As illustrated in FIG. 3 the neck region 330 of each end fitting is provided by a radially inner end fitting neck portion 370 and a radially outer portion 375. In the embodiment illustrated in FIG. 3 the radially inner portion is a generally cylindrical region of the end fitting body having a generally cylindrical inner surface forming part of the bore of the elongate end fitting body and a radially outer generally cylindrical surface 380. An outer portion of the neck region 375 has a generally cylindrical inner surface 385 and a generally cylindrical outer surface. The radially inner surface 385 of the outer neck portion 375 is spaced apart from the radially outer surface 380 of the inner portion 370 of the neck. This spaced apart relationship results in an area defining a chamber 390 that is enclosed within the neck of the end fitting. The radially inner and radially outer end fitting neck region portions 370, 375 may be integrally formed as a single unit with the elongate end fitting body or may be integrally formed by welding using girth welds and a longitudinal weld or otherwise securing a generally cylindrical collar between opposed surfaces of the connector flange $310_1$ and central flange 320. The inner and outer parts thus form a pipe-in-pipe arrangement. In the embodiment shown the inner and outer parts are coaxially aligned but the parts may be eccentrically aligned and need not be cylindrical.

Figure 4:
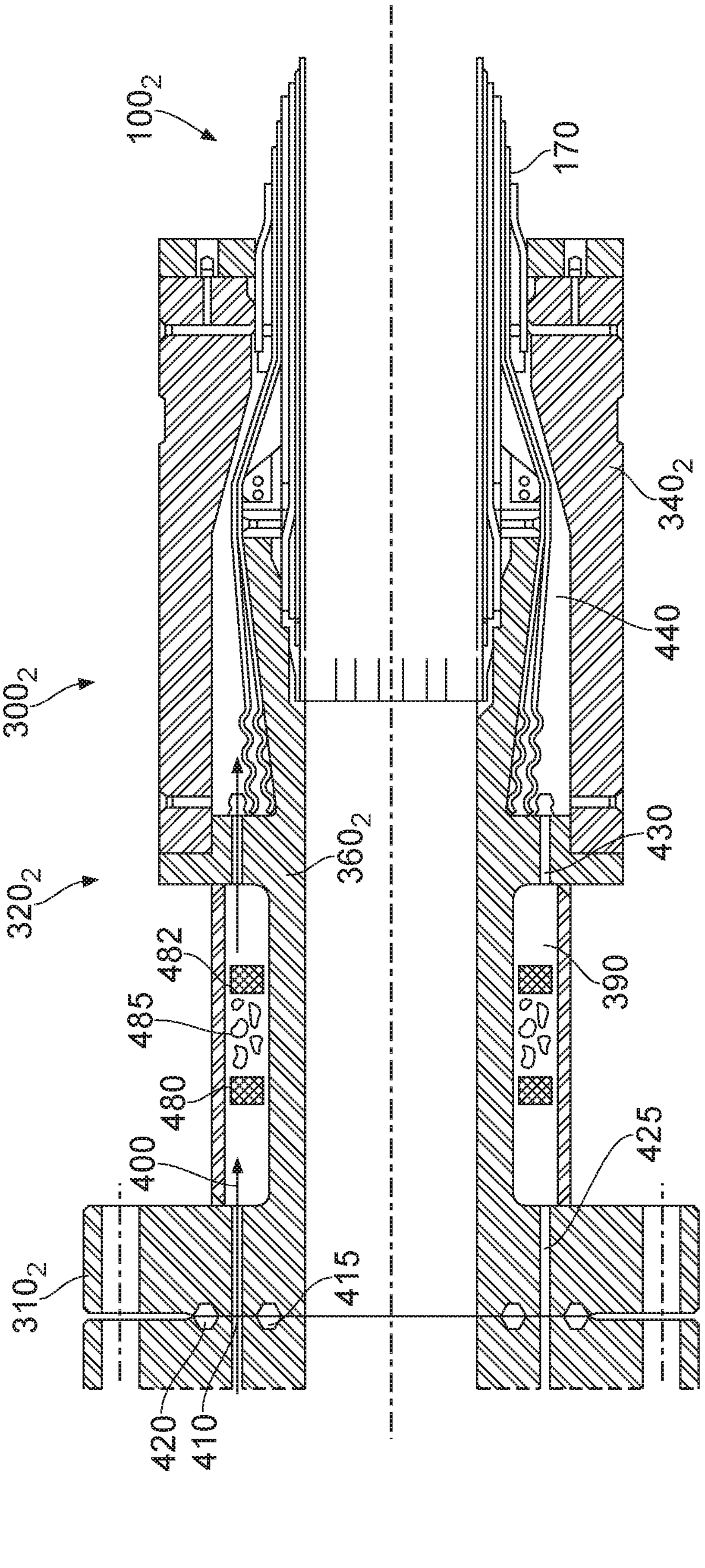
FIG. 4 illustrates an end fitting shown in FIG. 3 in more detail.

FIG. 4 illustrates the right-hand side most end fitting $300_2$ shown in FIG. 3 in more detail. FIG. 4 helps illustrate how the various separate layers of the flexible pipe body are terminated and where appropriate sealed. A pipe annulus is located between a radially outermost surface of a fluid retaining layer (a barrier layer is shown in FIG. 4) and a radially inner surface of an outer sheath 170. This annulus region is in fluid communication with the zone defined within the end fitting casing. FIG. 4 helps illustrate how a vent path can be provided by providing a fluid communication passageway between the annulus of one flexible pipe and another. Notably as illustrated in FIG. 4 the enclosed chamber region 390 provides an elongate passageway portion that extends across a whole length of the neck region. The enclosed chamber region can thus be used as part of an overall venting path leading to a surface burn off point or midwater vent valve.

According to certain embodiments of the present invention which utilise the enclosed chamber region for venting the enclosed chamber region provides a passageway portion to provide a first fluid communication passageway portion of a vent passage. The vent passage extends from an end surface of the connecting flange through the end fitting and is in fluid communication with the annulus of the flexible pipe body. As shown in FIG. 4 the vent passage 400 (illustrated by arrows in FIG. 4) has an inlet/outlet port 410 on an end surface of the connecting flange $310_2$. This port 410 is located between a radially inner seal ring 415 and a radially outer seal ring 420. These align with corresponding seal rings on the end of an adjacent end fitting. A through hole 425 extends through the connecting flange putting the inlet/outlet port 410 in fluid communication with the enclosed chamber region 390. A through hole 430 is likewise disposed through the central flange 320 of the elongate end fitting body 360 which thus puts the inlet/outlet port 410 in fluid communication with the region 440 between the outer casing and the open end of the elongate body. Although optionally filled with epoxy this space 440 is not fluid tight and is in fluid communication with the annulus region of the flexible pipe body 100. Optionally one or more tubes can be located within the epoxy area providing further portions of the vent passage between a lift off point where the tensile armour wires lift off from the underlying layer to a region close to the opening formed by the through bore 430 in the central flange. In this way a fluid communication passageway can be provided through a whole length of the end fitting body between the annulus of the flexible pipe body and an end of the end fitting. An advantage of this methodology is that only longitudinally extending passageways need to be manufactured through the flanges. That is to say no radially outwardly extending passageway portions need be utilised. Of course such communication passageways could be utilised if it were preferred to connect the vent passage in some other manner.

FIGS. 3 and 4 thus indicate apparatus for terminating an end of flexible pipe body. An elongate end fitting body which is associated with a central longitudinal axis includes a connector flange which is securable in a back-to-back relationship with a further end fitting body. An open mouth of the end fitting body receives a terminated end of flexible pipe body and includes various support surfaces each having a different radial extent to support respective ends of respective layers of the flexible pipe body. A neck region of the end fitting body extends between a central flange and the connector flange. The central flange is central to the extent that it is disposed between the two ends of the end fitting body. In this sense it is an intermediate flange. The central flange can be utilised to support an outer casing to help provide a space within an end fitting for tensile armour wires to be secured. At least one fluid communication passageway portion extends across a whole length of the neck region. This follows a straight path and follows a constant radial distance that is greater than a radial distance between the central longitudinal axis of the end fitting and a radially inwardly facing pressure armour support surface. The pressure armour support surface is proximate to the open mouth of the end fitting body and is used when flexible pipe body is terminated in the end fitting to support the pressure armour layer. The fluid communication passageway portion provided by the enclosed chamber region described in FIGS. 3 and 4 extends at a constant radial distance less than a radial distance between the central longitudinal axis and a radially outermost edge of the central flange. In the end fitting shown that radially outermost edge coincides with a radially outermost extent of an outer casing or jacket of the end fitting. In this sense constant radial distance encompasses exactly constant. According to certain other embodiments of the present invention "constant radial distance" refers to exactly remaining constant within natural manufacturing tolerances as well as very shallowly varying in a constant way. That is to say 10° or less relative to a primary axis associated with the bore of the pipe. Aptly the line of the fluid communication passageway is in a common plane with the primary bore axis. Aptly the line followed by the fluid communication passageway is straight but is offset in one or two dimensions by 10 or less. Aptly the offset is 5° or less and is the same or different in the two dimensions.

In the end fitting shown in FIGS. 3 and 4 only axially extending passageways are needed. That is to say no passageway needs to be provided that extends radially outwardly away from a central longitudinal axis associated with the end fitting and flexible pipe body terminated in the end fitting. The passageways are straight and inlet and outlets at opposed ends of each passageway portion lie the same distance from an axis of the bore through the end fitting body.

FIG. 4 helps illustrate how an upstream filter 480 and downstream filter 482 can be provided in a spaced apart relationship within the enclosed chamber region. These can be formed as ring-like elements. An active agent 485 can be located between the filter elements. Alternatively if the active agent does not degrade and has a size greater than an opening port into or out of the enclosed chamber region then the filter elements may not be required.

Figure 5:
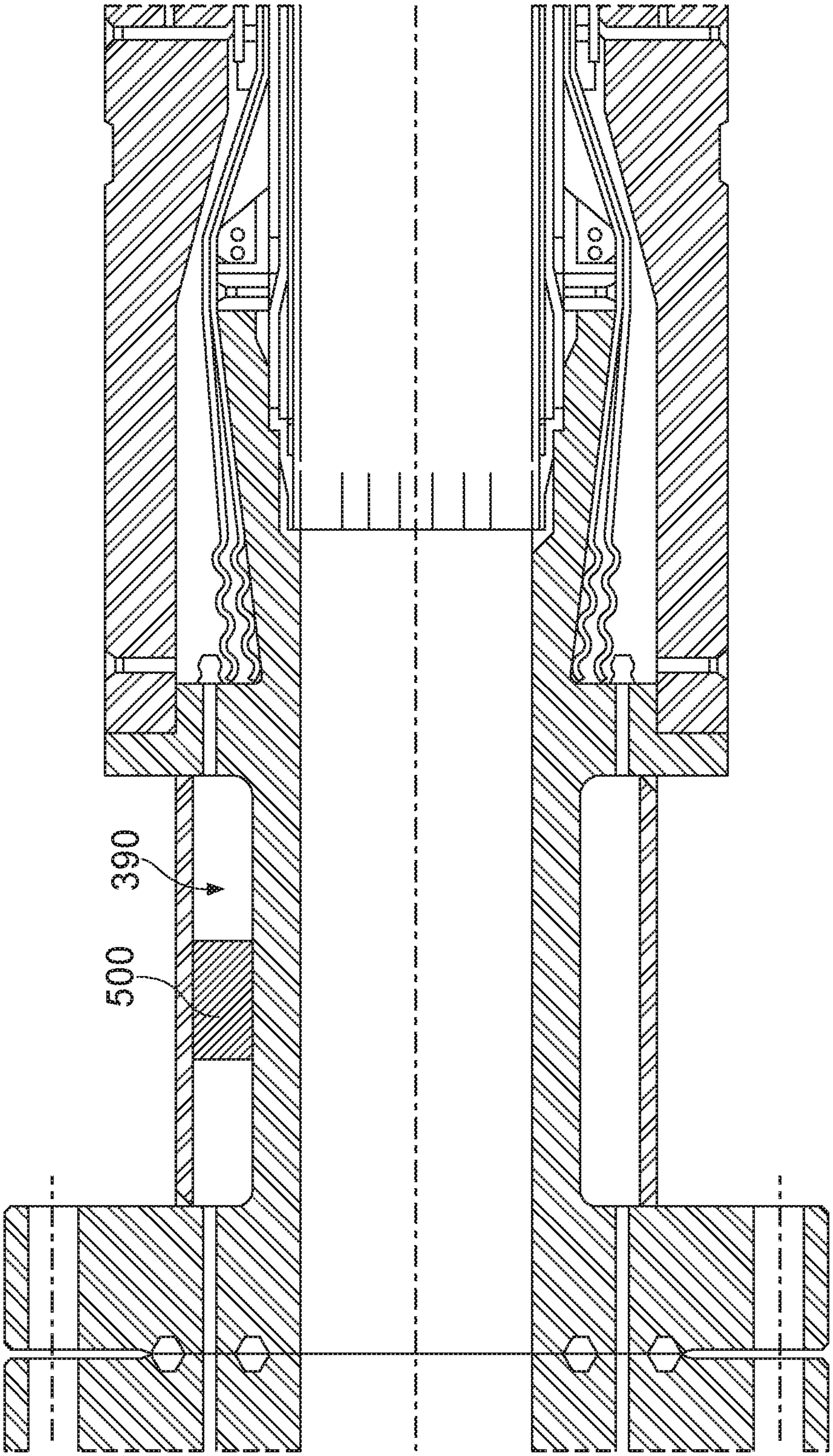
FIG. 5 illustrates auxiliary equipment in an enclosed chamber.

FIG. 5 illustrates an alternative use for the enclosed chamber region. In more detail FIG. 5 illustrates how auxiliary equipment 500 is housed within the enclosed chamber region 390. The auxiliary equipment may or may not require power. The auxiliary equipment may or may not be associated with a fibreoptic line. The auxiliary equipment may or may not be standalone apparatus.

Figure 6:
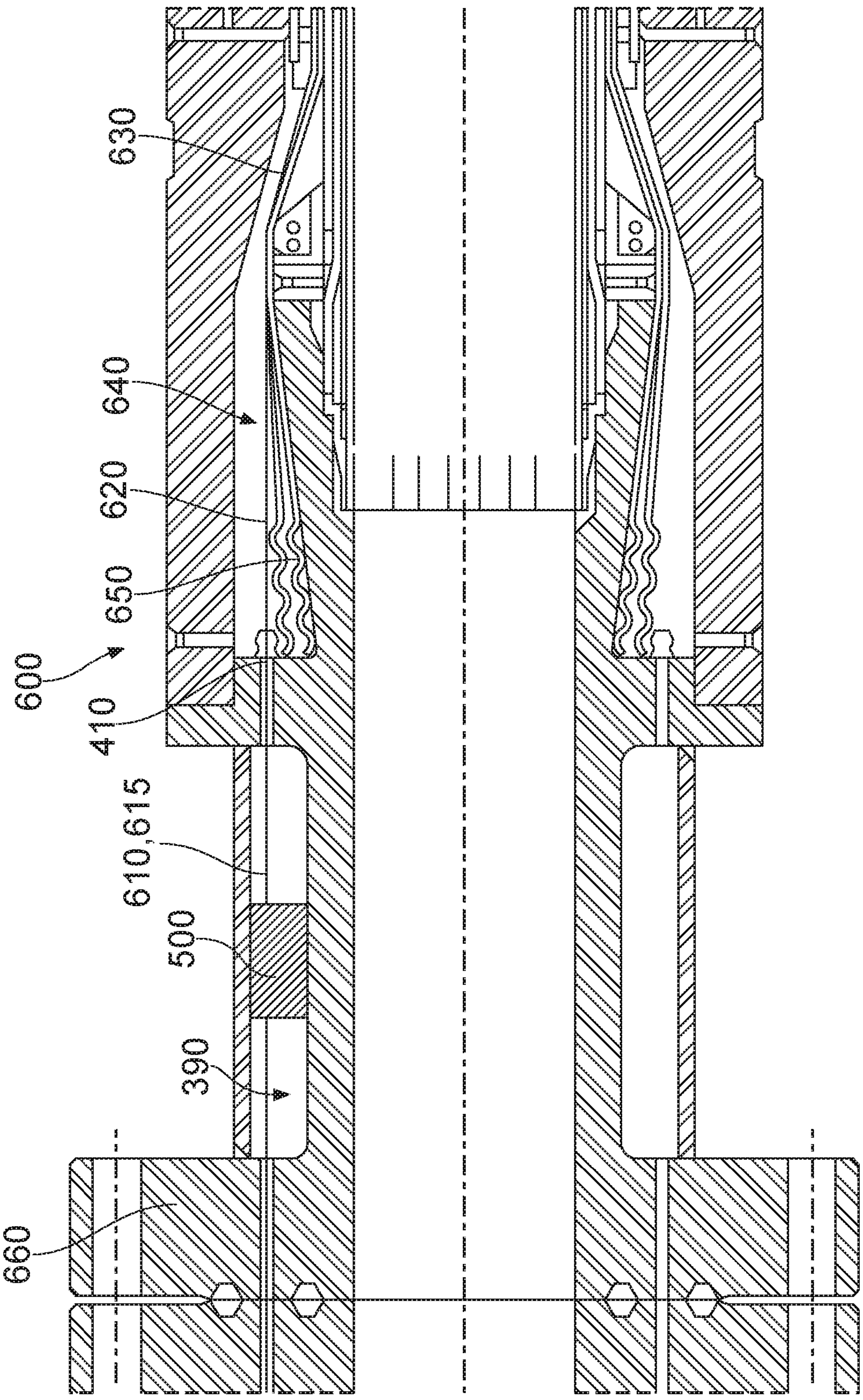
FIG. 6 illustrates a fibre optic/power line passing through an enclosed chamber.

FIG. 6 Illustrates an embodiment of an end fitting 600 in which at least one fibreoptic line 610 is associated with the auxiliary equipment 500 housed within the enclosed chamber region 390. At least one fibreoptic line 600 is interwoven with the individual tensile armour wires 620 of the tensile armour layer of the flexible pipe. Optionally one or more tensile armour wires 620 in the tensile armour layer are effectively replaced by at least one fibreoptic line 610. That is to say one or more fibre optic fibres are wound with the tensile armour wires to form a layer. The fibreoptic line 610 may be of the type of plastic fibreoptic line or any other suitable type of fibreoptic line. The fibreoptic line 610 is located in the tensile armour layer of the flexible pipe alongside a plurality of tensile armour wires 620. In the end fitting 600 the fibreoptic line 610 and the tensile armour wires 620 are peeled away from the central bore 630 and pass into the space between the outer casing and the end fitting body 640. The plurality of tensile armour wires 620 terminate in the space between the outer casing and the end fitting body 640. Optionally, and as illustrated in FIGS. 3 to 7, the terminating ends of the tensile armour wires are crimped 650. The fibreoptic line 610 by contrast is not crimped and passes through the space between the outer casing and the end fitting body 640 into the enclosed chamber region 390 via the inlet/outlet port 410. The fibreoptic line 610 further extends through the enclosed chamber region 390 and through the connecting flange 660 via the inlet/outlet port 410. The fibreoptic line 610 can thus be connected to auxiliary equipment 500 housed within the enclosed chamber region 390. The fibreoptic line 610 allows for communication and signal transmission between auxiliary equipment 500 and external facilities. Optionally the enclosed chamber region 390 does not contain auxiliary equipment and merely provides a secure passageway through which a fibreoptic line 610 can extend thereby ensuring that the fibreoptic line 610 is not exposed to the external environment and does not require termination at the end fitting 600. Optionally the fibreoptic line 610 can be connected to a fibreoptic line in the next pipe section, in which case the auxiliary equipment 500 comprises fibreoptic connection means, and/or signal boosting means.

FIG. 6 illustrates an embodiment of an end fitting 600 in which auxiliary equipment 500 housed within the enclosed chamber region 390 requires power delivery. Some types of auxiliary equipment that can be housed in a chamber region does not require power. At least one powerline 615 is interwoven within the tensile armour layer of the flexible pipe. One or more tensile amour wires 620 in the tensile armour layer are effectively replaced by at least one powerline. The powerline may be of the form of an armoured cable such as a steel wire armoured cable. Alternatively, the powerline may be any other suitable cable arrangement. The powerline is located in the tensile armour layer of the flexible pipe alongside a plurality of tensile armour wires 620. In the end fitting 600 the powerline and the tensile armour wires 620 are peeled away from the underlying layer at a lift off point and pass into the space between the outer casing and the end fitting body 640. The plurality of tensile armour wires 620 terminate in the space between the outer casing and the end fitting body 640. Optionally the terminating ends of the tensile armour wires are crimped 650. The powerline by contrast is not crimped and passes through the space between the outer casing and the end fitting body 640 into the enclosed chamber region 390 via the inlet/outlet port 410. The powerline further extends through the enclosed chamber region 390 and through the connecting flange 660 via the inlet/outlet port 410. The powerline can thus be connected to auxiliary equipment 500 housed within the enclosed chamber region 390. The powerline allows for the supply of power to auxiliary equipment 500 housed within the enclosed chamber region 390 of the end fitting 600 from topside facilities or from other suitable power sources. Optionally the enclosed chamber region 390 does not contain auxiliary equipment 500 and provides a secure passageway through which a powerline 615 can extend thereby ensuring that the powerline 615 is not exposed to the external environment and does not require termination at the end fitting 600.

Figure 7:
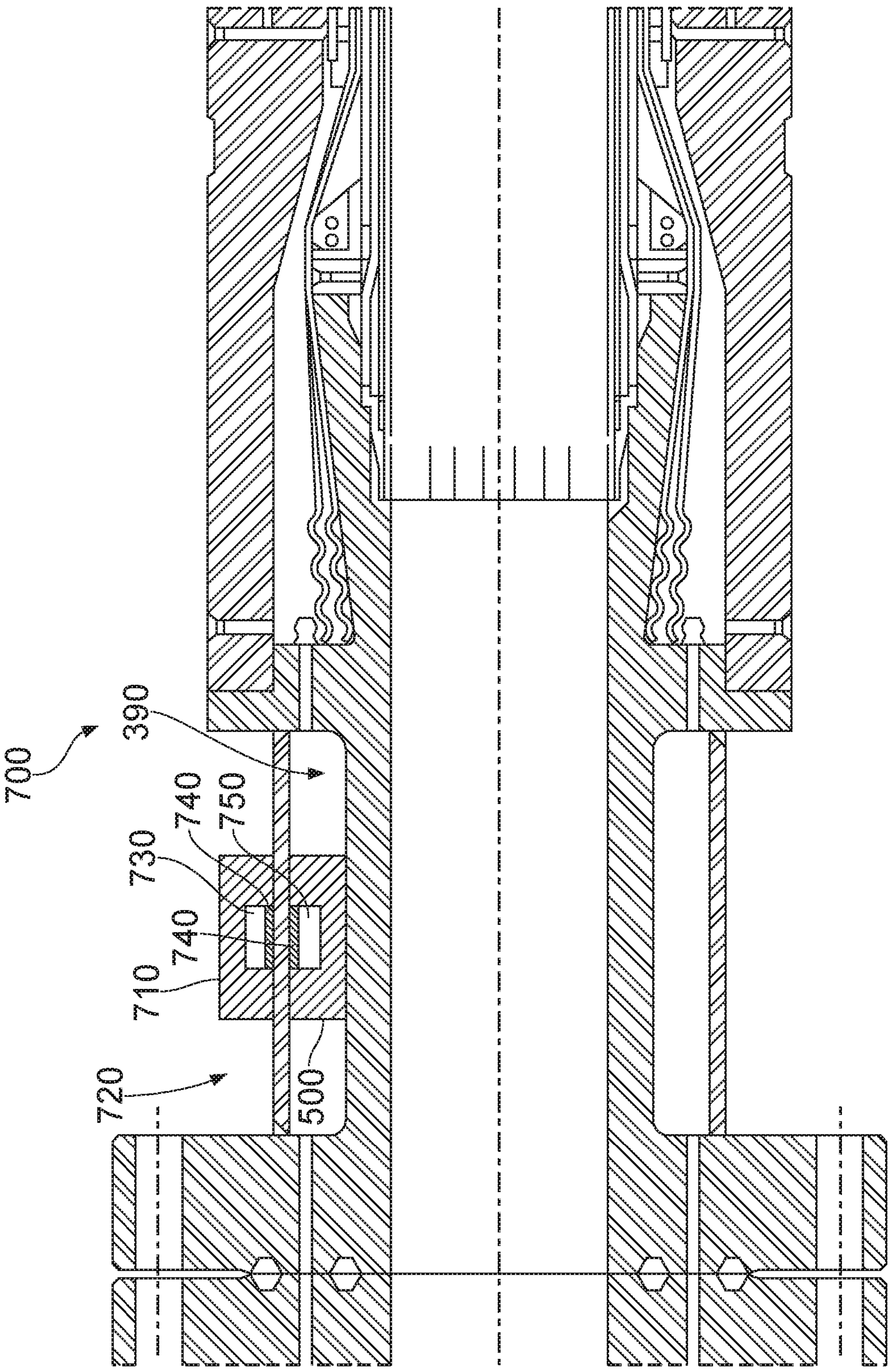
FIG. 7 illustrates power delivery for auxiliary equipment.

FIG. 7 illustrates an alternative embodiment of an end fitting 700 in which auxiliary equipment 500 housed within the enclosed chamber region 390 requires power delivery. External power delivery equipment 710 is secured onto the neck region 720 of the flexible pipe end fitting 700. Securement can be achieved by clamping or can be by more permanent methods such as welding. The external power delivery equipment 710 comprises a first inductor element 730 through which Alternating Current (AC) electrical power is passed. Optionally the external power delivery equipment comprises insulating element/s 740 between the first inductor element and the flexible pipe end fitting. Optionally suitable cladding, such as suitable polymeric cladding, provides insulation between the first inductor element and the end fitting. In the enclosed chamber region of the end fitting there is provided a further inductor element 750. Optionally the insulating element/s are located between the further inductor element and the pipe end fitting. The flow of AC through the first inductor element 730 produces a varying electromagnetic field which thus induces an electric current in the further inductor element 750. Auxiliary equipment 500 housed within the enclosed chamber region 390 can thus be powered by external power delivery equipment 710. Optionally the further inductor element 750 is part of the auxiliary equipment 500. Optionally the further inductor element 750 is separate from, but connected to, the auxiliary equipment 500. Optionally the external power delivery equipment 710 is part of a power generating device. Optionally the external power delivery equipment 710 is connected to a separate power generating device. Optionally the external power delivery equipment 710 comprises a power storage device such as a battery. Optionally power is fed to the power delivery equipment 710 from a pipe-mounted turbine of, for example, the type outlined in EP3060791.

Optionally according to certain embodiments of the present invention auxiliary equipment may include apparatus associated with the fibreoptic line 610. This auxiliary equipment 500 may include an optical modem, wireless communication apparatus or other such communication apparatus. This auxiliary equipment 500 may include a processor. This auxiliary equipment 500 may include local pipe monitoring apparatus such as sensors. The fibreoptic line 610 may be responsible for communication/signal transmission or may be configured such that it constitutes part or a sensory system such as a strain or vibration sensor for example. The auxiliary equipment 500 may then be associated with the signals/data carried within the fibreoptic line 610.

Optionally according to certain embodiments of the present invention auxiliary equipment may include a sensor. The sensor may be configured to measure pressure, gas, temperature, strain or any other observable parameter associated with the pipe. This sensor may be associated with a fibreoptic line 610 as illustrated in FIG. 6 or may be a standalone sensor. The sensor may require power as illustrated in FIG. 6 and FIG. 7. This sensor may be a motion sensor and may be configured to detect general pipe motion (particularly for subsea flexible pipes) or may be a sensor configured to detect any other type of motion. In particular the motion sensor may be a vibration sensor and may be configured for the detection of Flow Induced Pulsations (FLIP), to monitor vibration and to alert an operator if vibration exceeds an acceptable threshold value. The motion sensor may be a piezoelectric accelerometer, a fibreoptic vibration sensor or any other type of suitable motion sensor or the like.

Optionally according to certain embodiments of the present invention auxiliary equipment may include a temperature regulation device. In particular for subsea applications production in which the cooling of production fluids due to the environmental temperature can lead to pipe blockages, the temperature regulation device may include a heating device. Other applications may require the auxiliary equipment 500 to include a cooling device. The temperature regulation device may optionally require power as illustrated in FIG. 6 and FIG. 7. A subsea flexible pipe can be heated by passing warm/hot fluid through pipe layers or through dedicated tubes/lines within the flexible pipe. The fluid or the fluid containing tubes/lines may pass into the enclosed chamber region and that the temperature regulation device may include heating or cooling devices to heat or cool this fluid. The temperature regulation device may include a valve and/or a pump to control the flow of this fluid. The temperature regulation device may include a temperature sensor. The temperature regulation device may include a means of maintaining an acceptable or pre-set temperature.

Optionally according to certain embodiments of the present invention auxiliary equipment may include a signal booster/amplifier. The signal booster/amplifier may be configured to permit wireless communications between top-side facilities and subsea modules or to permit wireless communication between subsea modules. The signal booster/amplifier may also be configured to counteract any environmental signal attenuating properties. The signal booster/amplifier may comprise one or more antennae and an amplifier.

Optionally according to certain embodiments of the present invention auxiliary equipment may include a device configured for in-service monitoring of the flexible pipe. The in-service monitoring of pipe performance allows for optimised operation, reduced risk of failure and early detection of potential issues. The device may be configured to monitor any number of pipe properties. These properties may include pipe strain (indicative of pipe fatigue), temperature (indicative of pipe damage/breach, overheating of polymer layers and pipe flow), and pipe annulus pressure or annulus gasses (indicative of valve faults and corrosion). The auxiliary equipment may include an ultrasound emitter and an ultrasound detector configured to locally detect defects in pipe structure (possibly caused by fatigue, corrosion, erosion or accidental damage) and blockages in the line.

Optionally according to certain embodiments of the present invention auxiliary equipment may include a chargeable battery. Optionally, the batteries may be charged by a powerline 610 interwoven into the tensile armour layer of the flexible pipe as shown in FIG. 6. Optionally the power supplied through the powerline is from topside facilities or from any other suitable power supply location, such as a subsea turbine located near or on the pipeline. Optionally the batteries may be charged by inductive charging as shown in FIG. 7. These batteries may be configured to power further equipment, particularly subsea equipment. These batteries may be configured as a backup power source for further equipment, particularly subsea equipment, in the event of power failure at a power source.

Optionally according to certain embodiments of the present invention auxiliary equipment includes a turbine, or any other suitable power generation device, configured to generate power via the fluid communication passageway provided by the enclosed chamber region 390. Optionally the power generation device may be located such that vent gases or heating/cooling fluids pass proximate to said power generation device.

Figure 8:
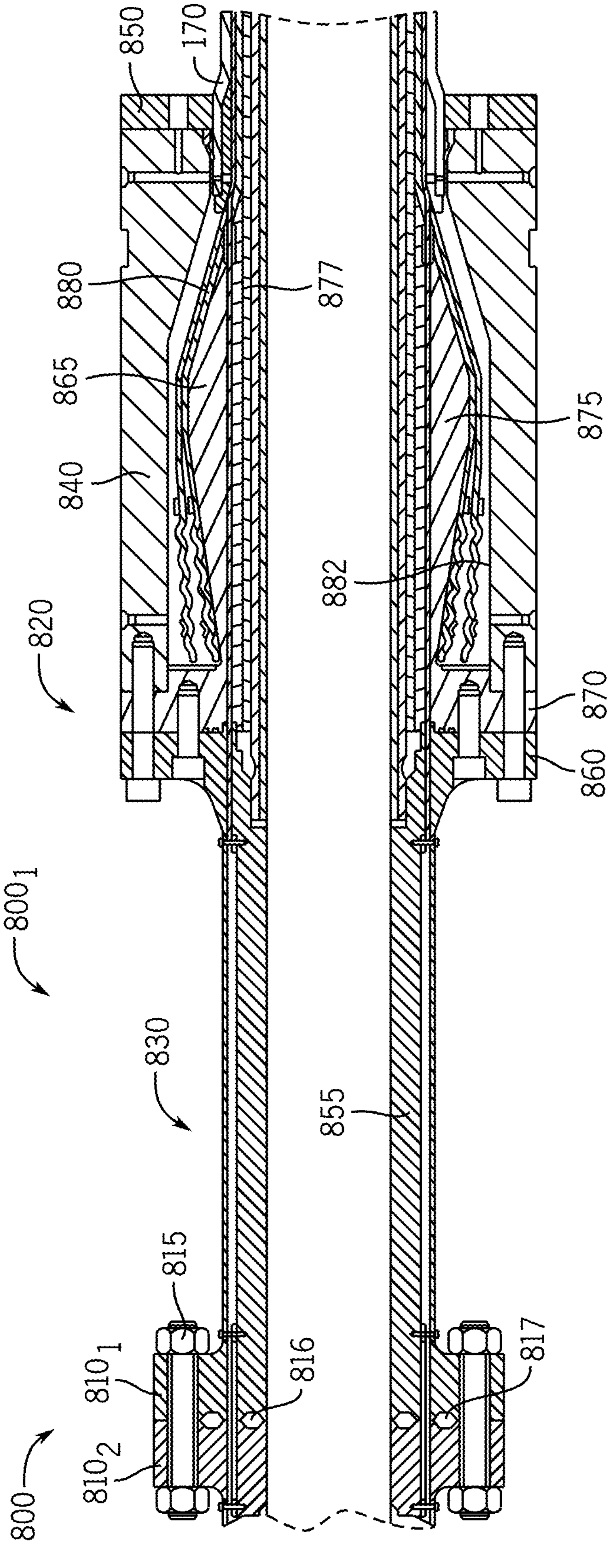
FIG. 8 illustrates alternative end fittings in a back-to-back configuration.

FIG. 8 illustrates two alternative end fittings 800$_1$, 800$_2$ arranged in a back-to-back arrangement. Each end fitting (only an end of a connecting flange of one of the end fittings 800$_2$ is illustrated in FIG. 8) terminates a respective end of a respective segment of flexible pipe body. The end fittings are connected together via respective connector flanges 810$_1$, 810$_2$. These are bolted together via bolts 815 and have seal rings let into opposing faces. The seal rings include an inner seal ring 816 and an outer seal ring 817. The inner and outer seal rings are spaced apart and substantially concentric and thus locate radially inside and radially outside of a fluid communication passageway extending between end fittings. Each end fitting 800$_{1,2}$ further includes a central flange 820 spaced apart from the connector flange 810 via a neck region 830. The central flange is central in the sense that it is intermediate between an end connector flange and a remaining end of the end fitting body. This may be in the middle of the end fitting body end points or may be more towards one end than the other. An outer casing 840 is secured to the central flange and an activation flange 850 is secured to the casing and seals against an outer surface of an outer sheath 170 of the flexible pipe body 100. The central flange illustrated in FIG. 8 is formed from two component parts. This is because the elongate end fitting body shown in FIG. 8 is not integrally formed but rather is formed from two key component parts. Notably as illustrated in FIG. 8 a first part of the end fitting body is provided by a termination member 855 includes the connector flange region 810, a neck region 830 and a first portion 860 of the central flange region 820. The elongate end fitting body also comprises a core member 865 that includes a further portion 870 of the central flange region and an elongate nose 875 extending from the further central flange region portion. The nose region 865 includes a radially inward facing support surface 877 that supports a radially outer surface of a pressure armour layer. An end of the nose helps define an open mouth of the end fitting body.

A radially outer surface 880 of the nose 875 of the core member is spaced apart from a radially inner surface 882 of the casing to provide a space in which tensile armour wires are terminated. Optionally this space is filled with epoxy to help entomb the tensile armour wires when the flexible pipe body is terminated in the end fitting.

In contrast to the end fitting illustrated in FIGS. 3 to 7 a fluid communication passageway portion is provided in the neck region 830 by covering axially extending recesses formed as troughs in an outer surface of the neck region of the termination member. This is illustrated more clearly in FIG. 9.

Figure 9:
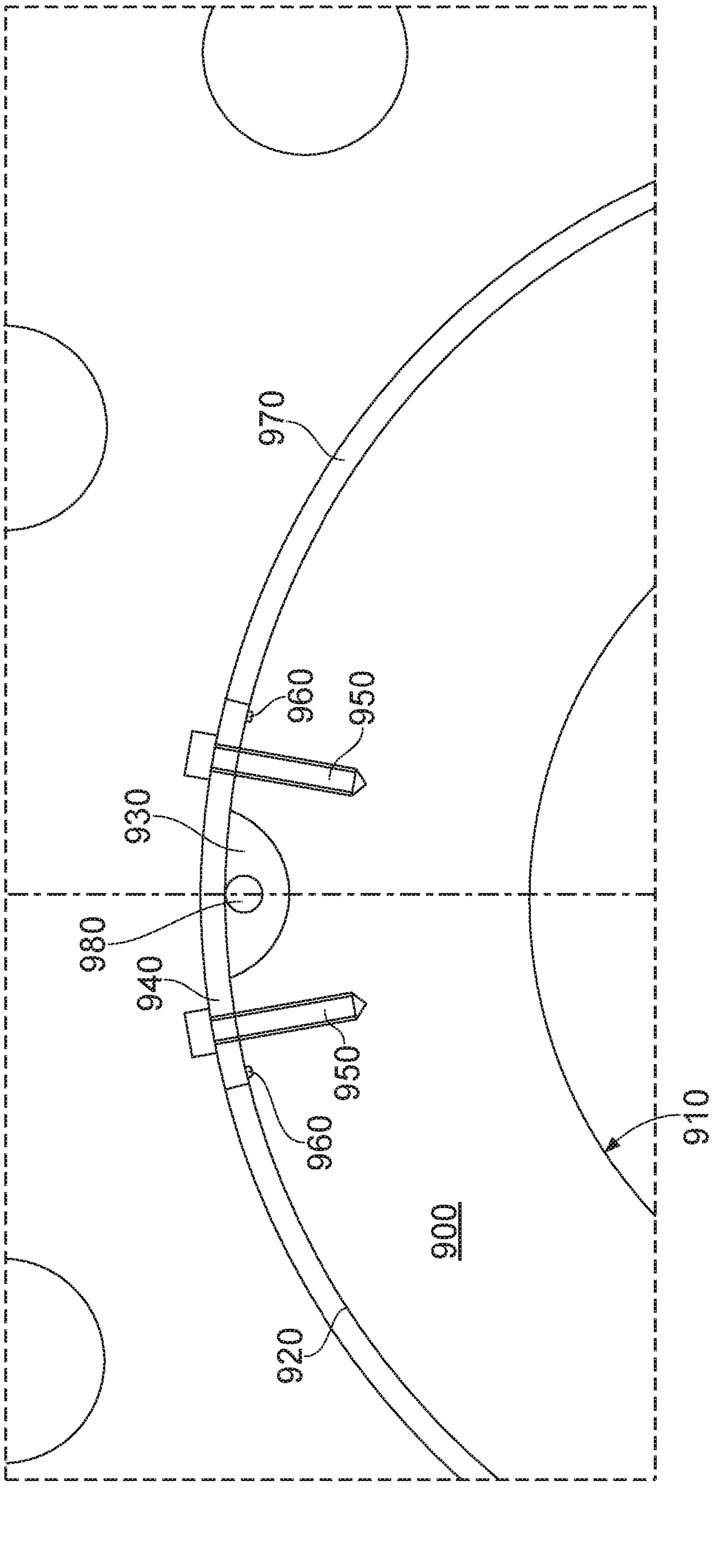
FIG. 9 illustrates an end fitting shown in FIG. 8 in more detail and shows recessed troughs covered to form enclosed chambers.

FIG. 9 illustrates a cross section through the neck 830 of the end fitting illustrated in FIG. 8. As illustrated in FIG. 9 the neck 830 includes a generally cylindrical body 900 that defines a radially inner surface 910 and a radially outer surface 920. These surfaces are generally cylindrical surfaces that are spaced apart and concentric. The radially inner surface 910 forms the bore along which fluid flows through the elongate end fitting body where the neck is located. An elongate recess 930 forms a channel along a length of the neck. One or more channels formed as recesses in the outer surface 920 of the neck can be provided. These can be arranged circumferentially in a spaced apart relationship around the outer surface of the neck. They can be equally or non-equally spaced apart. A cover 940 is secured via bolts 950 (or via some other securing mechanism such as adhesive or welding or the like) is secured over the recess and optional seals 960 are provided in small recessed troughs that run along the opposed sides of the recessed channel. This enables the end fitting body to be integrally formed with only recessed regions and then a cover to be secured if/where needed at the point of terminating flexible pipe body in the end fitting. As illustrated in FIG. 9 the neck may include an outer section that is stepped up or otherwise raised so that an outer surface mates or aligns with an outer surface of the cover. Alternatively, this outer region 970 can be provided by a further collar that is likewise secured in a suitable mechanism. Alternatively, no outer collar 970 can be utilised in which case the cover 940 may stand a little proud of the outer surface of the neck region. FIG. 9 illustrates how a tube 980 may be located in the recess and extend along the neck. Optionally the feature 980 presents the position of a vent passageway or port through the central flange section 860, or connector flange 810$_1$, with respect to the elongate recess 930.

Figure 10:
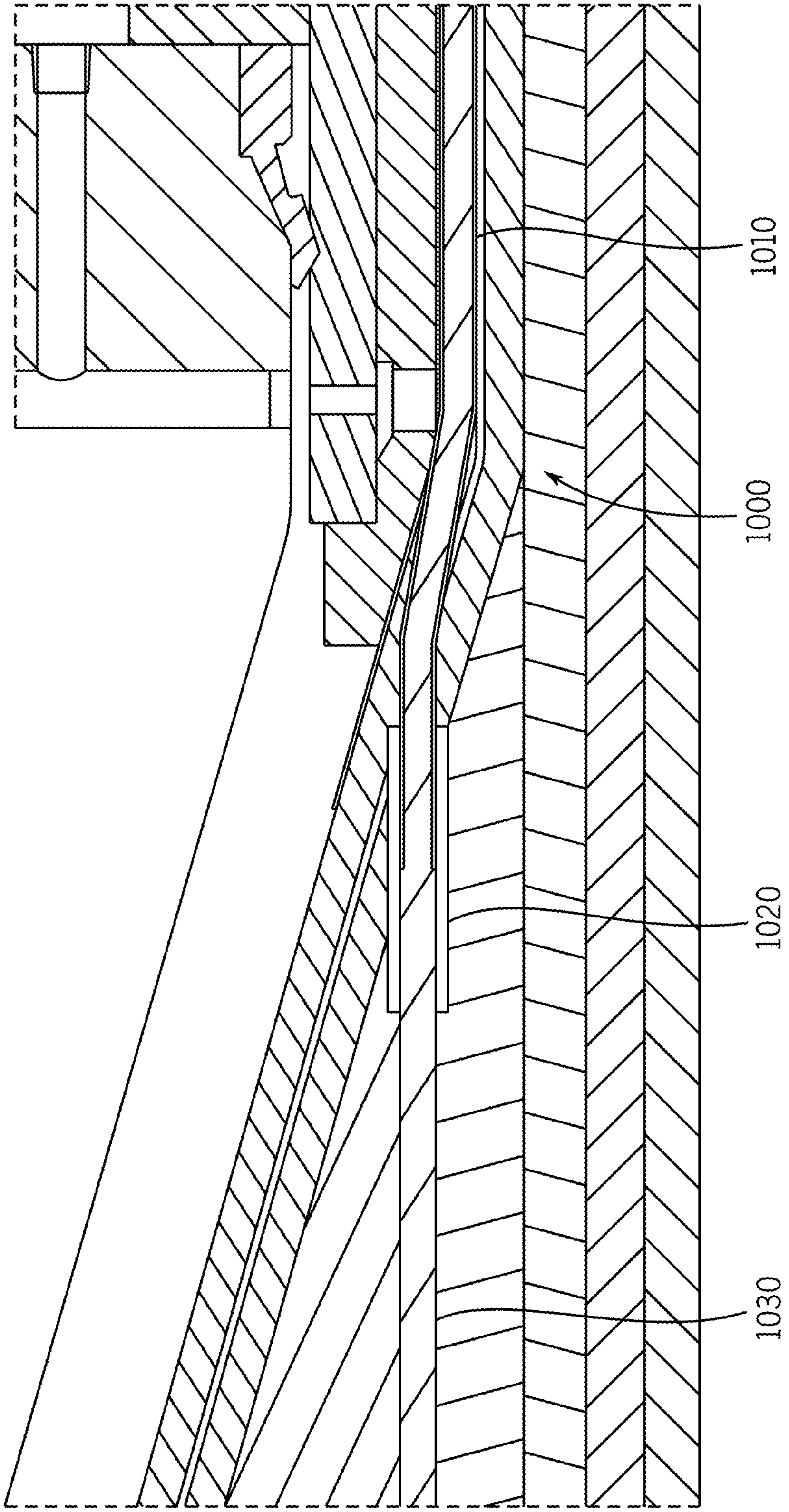
FIG. 10 illustrates a vent tube close to a lift off point.

FIG. 10 illustrates a lift off point 1000 where tensile armour wires begin to lift off away from an underlying layer (for example a pressure armour or anti fretting layer) when flexible pipe body is terminated in an end fitting. FIG. 10 also illustrates how one or more of the tensile armour wires may be wound as a tube 1010 over at least part of a length of flexible pipe body.

This tube 1010 lies in the flexible pipe body annulus and helps drain fluid from the flexible pipe annulus. A connector 1020 which is a generally cylindrical rigid element connects the wound tube 1010 to a rigid tube 1030 which passes through the end fitting. The rigid tube 1030 is in fluid communication with other through bores and the recessed troughs in the neck as illustrated in FIG. 8.

The end fitting illustrated in FIGS. 3 to 7 and the end fitting illustrated in FIGS. 8 to 10 thus provide enclosed chambers or sealed chambers in a neck region of the end fitting. These channels or channel sections may contain a reagent or other active element which may be pelletised or containerised or otherwise constrained by some means. A reagent in these regions may be active or reactive or activated or may be released through interaction with a fluid which passes through the channel on its passage from one segment of flexible pipe body to an adjacent section of flexible pipe body through the connected end fittings.

Aptly suitable reagents may include but are not limited to an oxygen scavenger and/or a de-hydrating agent and/or a corrosion inhibitor mix or solution (for instance one or more of amines or hydrazines such as hexamine, phenylenediamine, dimethylethanolamine, and other derivatives, sulphite or ascorbic acid or a chemical such as benzalkonium chloride). Aptly a suitable reagent is a chemical for removing H2S (for instance selected amines) or a chemical for removing carbon dioxide.

Aptly a suitable reagent in the sealed chamber or enclosed chamber may be a dye or other colour indicating chemical (such as fluorescein) which disperses in water colouring it and indicating an origin of fluid which has transited through an end fitting connection. Optionally a filter system can be utilised to prevent contaminants from one section of pipe from entering an adjacent section of pipe. The filter system can comprise at least one of sand/silica; activated carbon/charcoal; lime (calcium oxide); oxides, carbonates, bicarbonates, carbides, phosphates or thiophosphates, nitrates, nitrides or silicates, these typically of metals (such as, but not limited to, calcium, aluminium, titanium, iron, magnesium, zinc, lithium) or hydrogen; or pellets (for instance polymer pellets) coated in chemicals such as these.

The reagents may be in the form of a powdered solid, solid granules or liquid; the reagent may be contained in the channels or channel sections using fine mesh, or a sealed pouch of suitable material such as PVA (or another suitably dissolvable material) which dissolves in contact with a solvent fluid medium (for instance water). The reagent may be dispersible or dissolvable in a fluid medium such as water.

The sealed chamber or enclosed chamber which form passageway portions can also be suitable for providing a connection route for monitoring systems, for instance of the electrical or optical types which are known to those skilled in the art for monitoring flexible pipes), including sufficient space for provisioning connections between lengths of monitoring system (electrical cable or fibreoptic), or for housing a signal booster system to extend the distance along which a monitoring system is useful. When the channels are being used for connecting or extending monitoring systems the channels or channel sections will be connecting the annuli of sections of flexible pipe body, but may not necessarily be in fluid communication with the annuli of those flexible pipe bodies (rather, they may be in communication with the sealed monitoring system cables or tubes containing fibre optics or FIMTs).

Certain embodiments of the present invention can utilise a channel provided by an enclosed chamber or sealed chamber for providing access to install and/or maintain a heating system in a section of flexible pipe in order to facilitate passing heat through the end fitting body into bore fluids to help thereby maintain flow.

Throughout the description and claims of this specification, the words “comprise” and “contain” and variations of them mean “including but not limited to” and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An apparatus for terminating an end of a flexible pipe body, comprising:

an elongate end fitting body, associated with a central longitudinal axis, comprising a connector flange region securable in a back-to-back relationship to a further end fitting body and disposed at a first end of the elongate end fitting body, an open mouth at a remaining end of the end fitting body, a central flange region disposed between the first end and the remaining end and a neck region between the central flange and the connector flange; wherein the neck region comprises a radially inner end fitting neck region portion and a radially outer end fitting neck region portion that is spaced apart from and is radially outside the radially inner end fitting neck region portion such that the region between the radially outer end fitting neck region and the radially inner end fitting neck region is substantially enclosed;

the elongate end fitting body further defining a through hole disposed through the central flange of the elongate end fitting body and in fluid communication with a chamber between the radially outer end fitting neck region and the radially inner end fitting neck region, the diameter of the through hole being smaller than the width of the chamber.

2. The apparatus as claimed in claim 1, further comprising:

the radially inner end fitting neck region portion comprises a generally cylindrical outer surface and the radially outer end fitting neck region portion comprises a generally cylindrical inner surface that is disposed in a concentric or eccentric spaced apart relationship with the cylindrical outer surface.

3. The apparatus as claimed in claim 1, further comprising:

the radially inner end fitting neck region portion and the radially outer end fitting neck region portion are disposed in a pipe-in-pipe relationship.

4. The apparatus as claimed in claim 1, wherein the connector flange region, and central flange region and radially inner end fitting neck region portion are integrally formed.

5. The apparatus as claimed in claim 1, wherein the elongate end fitting body comprises:

a termination member that includes the connector flange region, the neck region and a first portion of the central flange region; and a core member that comprises a further portion of the central flange region and an elongate nose region extending from the further central flange region portion and that includes a radially inward facing support surface region proximate to the remaining end.

6. The apparatus as claimed in claim 1, further comprising:

an outer casing securable to the central flange region; and an activation flange securable to the outer casing.

7. The apparatus as claimed in claim 1, further comprising an enclosed chamber region between the radially inner end fitting neck region portion and radially outer fitting neck region portion, wherein the enclosed chamber region comprises an elongate annulus shaped region.

8. The apparatus as claimed in claim 7, wherein the enclosed chamber region provides a passageway portion that extends across a whole length of the neck region.

9. The apparatus as claimed in claim 8, further comprising:

a vent passage comprising a first fluid communication passageway portion, that comprises said a passageway portion, that includes a first fluid inlet/outlet port proximate to an end of the first fluid communication passageway portion and a further fluid inlet/outlet port on an end surface of the connector flange region distal to the open mouth.

10. The apparatus as claimed in claim 7, further comprising:

at least one active agent disposed in the enclosed chamber region.

11. The apparatus as claimed in claim 10, further comprising:

at least one filter element each disposed proximate to at least one of a first end and a remaining end of the enclosed chamber region in which the active agent is disposed.

12. The apparatus as claimed in claim 10, further comprising:

the active agent comprises an oxygen scavenger and/or a de-hydrating agent and/or a corrosion inhibitor and/or a chemical for removing hydrogen sulfide and/or a chemical for removing carbon dioxide and/or a dye or colour indicating chemical.

13. The apparatus as claimed in claim 10, wherein each active agent is in the form of a powdered solid and/or solid granules and/or a liquid.

14. The apparatus as claimed in claim 7, wherein the enclosed chamber houses auxiliary equipment.

15. A method of terminating an end of flexible pipe body, comprising the steps of:

providing flexible pipe body that comprises a fluid retaining layer, at least one armour layer and an outer sheath;

providing an elongate end fitting body, comprising a connector flange region, a central flange region and a neck region between the connector flange region and the central flange region, at a free end of the flexible pipe body, said end fitting body supporting a terminated end of at least one layer of the flexible pipe body, thereby providing a vent passage that comprises a first fluid communication passageway portion provided by an enclosed chamber region between a radially inner end fitting neck portion and a radially outer end fitting neck region portion in fluid communication with a flexible pipe annulus associated with the flexible pipe body;

securing an outer casing to the central flange region; and securing an activation flange to the outer casing.

16. The method as claimed in claim 15, wherein providing the elongate end fitting body comprises:

providing a radially inner end fitting neck region portion that comprises a cylindrical outer surface; and providing a radially outer end fitting neck region portion that comprises a generally cylindrical inner surface that is disposed in a concentric or eccentric spaced apart relationship with the cylindrical outer surface.

17. The method as claimed in claim 15, wherein providing the fluid communication passageway portion comprises:

providing a first fluid inlet/outlet port proximate to an end of the first fluid communication passageway portion and a further fluid inlet/outlet port on an end surface of the connector flange distal to an open mouth of the end fitting body.

18. A method of venting fluid from a flexible pipe annulus, comprising the steps of:

selectively opening at least one valve member thereby fluidly connecting a vent passage between a flexible pipe annulus, located between an inner fluid retaining layer and an outer sheath of flexible pipe body, and an exhaust port; and subsequently venting fluid from the flexible pipe annulus via the vent passage through an enclosed chamber region, that is disposed in a neck region of an elongate end fitting body between a radially inner end fitting neck region portion and a radially outer end fitting neck region portion that is spaced apart from and is radially outside the radially inner end fitting neck region portion.

19. The method as claimed in claim 18, further comprising:

venting fluid from the flexible pipe annulus via a first fluid communication passageway portion that comprises the enclosed chamber region and via a further fluid communication passageway portion that extends across the connector flange region.

20. The method as claimed in claim 19, further comprising:

venting fluid from the flexible pipe annulus via a still further fluid communication passageway portion that comprises either a through bore through the central flange and an aligned tube having an open end in a tensile armour termination cavity, or a through bore through a core portion of the end fitting body.

* * * * *